(12) United States Patent
Kubo

(10) Patent No.: US 12,078,613 B2
(45) Date of Patent: Sep. 3, 2024

(54) IDENTIFICATION APPARATUS, IDENTIFICATION METHOD, IDENTIFICATION PROCESSING PROGRAM, GENERATION APPARATUS, GENERATION METHOD, AND GENERATION PROCESSING PROGRAM

(71) Applicant: NIPPON TELEGRAPH AND TELEPHONE CORPORATION, Tokyo (JP)

(72) Inventor: Yuki Kubo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 415 days.

(21) Appl. No.: 17/602,483

(22) PCT Filed: Apr. 9, 2020

(86) PCT No.: PCT/JP2020/015984
§ 371 (c)(1),
(2) Date: Oct. 8, 2021

(87) PCT Pub. No.: WO2020/209337
PCT Pub. Date: Oct. 15, 2020

(65) Prior Publication Data
US 2022/0205955 A1 Jun. 30, 2022

(30) Foreign Application Priority Data
Apr. 12, 2019 (JP) ................ 2019-076445

(51) Int. Cl.
*G01N 29/12* (2006.01)
*G01N 29/44* (2006.01)
*G01N 29/46* (2006.01)

(52) U.S. Cl.
CPC ......... *G01N 29/12* (2013.01); *G01N 29/4418* (2013.01); *G01N 29/46* (2013.01); *G01N 2291/023* (2013.01)

(58) Field of Classification Search
CPC .... G01N 29/12; G01N 29/2437; G01N 29/46; G01N 29/4418; G01N 29/348;
(Continued)

(56) References Cited

U.S. PATENT DOCUMENTS 10,620,169 B2 * 4/2020 Enamito ................ G01N 29/11
2008/0144927 A1   6/2008 Hashimoto et al.
2008/0159529 A1   7/2008 Aarts et al.

FOREIGN PATENT DOCUMENTS

JP    2007537527 A    12/2007
JP    2008151538 A    7/2008

OTHER PUBLICATIONS

Dingzeyu Li et al., AirCode: Unobtrusive Physical Tags for Digital Fabrication, Proceedings of the Annual ACM Symposium on User Interface Software & Technology (UIST '17), Oct. 22, 2017.
(Continued)

*Primary Examiner* — An H Do
(74) *Attorney, Agent, or Firm* — Harness, Dickey & Pierce, P.L.C.

(57) ABSTRACT

An identification device according to one embodiment includes a vibration generation unit that generates, by a vibration generator, first vibrations to be provided to a three-dimensional object to be identified having an integrated structure; an acquisition unit that acquires, from a vibration detector, a detection signal corresponding to a second vibration that has propagated inside the three-dimensional object among the first vibrations provided to the three-dimensional object; a feature quantity generation unit that generates a feature quantity indicating a frequency characteristic of the second vibration, based on the acquired
(Continued)

detection signal; and an identification unit that identifies the three-dimensional object to be identified, based on a feature quantity stored in a storage device in which the feature quantity indicating a frequency characteristic based on a vibration that has propagated inside a previously identified three-dimensional object is stored and on the feature quantity generated by the feature quantity generation unit.

15 Claims, 13 Drawing Sheets

(58) Field of Classification Search
CPC ..... G01N 2291/2698; G01N 2291/024; G01N 2291/023; G01V 1/00
See application file for complete search history.

(56) References Cited

OTHER PUBLICATIONS

Dingzeyu Li et al., Acoustic Voxels: Computational Optimization of Modular Acoustic Filters, SIGGRAPH 2016 Technical Paper, Jul. 24, 2016.

* cited by examiner

IDENTIFICATION APPARATUS, IDENTIFICATION METHOD, IDENTIFICATION PROCESSING PROGRAM, GENERATION APPARATUS, GENERATION METHOD, AND GENERATION PROCESSING PROGRAM

CROSS-REFERENCE TO RELATED APPLICATIONS

This application is a 371 U.S. National Phase of International Application No. PCT/JP2020/015984 filed on Apr. 9, 2020, which claims priority to Japanese Application No. 2019-076445 filed on Apr. 12, 2019. The entire disclosures of the above applications are incorporated herein by reference.

TECHNICAL FIELD

The present invention relates to an identification device, an identification method, an identification processing program, a generation device, a generation method and a generation processing program.

BACKGROUND ART

There is a method that embeds information in a three-dimensional object 3D-printed by a 3D (three dimensions) printer for identifying the object.

As a first method, there is a method that distinguishes between a portion with an air pocket and a portion without an air pocket by utilizing a difference in light reflectivity of a 3D-printed object having air pockets provided inside the object and restores information from the presence or absence of an air pocket (for example, see Non-Patent Literature 1).

Further, as a second method, there is a method that embeds and identifies information using sound vibrancy in air pockets provided inside an object (for example, see Non-Patent Literature 2).

CITATION LIST

Non-Patent Literature

Non-Patent Literature 1: Dingzeyu Li, Avinash S. Nair, Shree K. Nayar, Changxi Zheng. AirCode: Unobtrusive Physical Tags for Digital Fabrication. In Proceedings of the Annual ACM Symposium on User Interface Software & Technology (UIST '17). ACM.

Non-Patent Literature 2: Dingzeyu Li, David I. W. Levin, Wojciech Matusik, and Changxi Zheng. 2016. Acoustic Voxels: Computational Optimization of Modular Acoustic Filters. ACM Trans. Graph. 35, 4, Article 88 (July 2016), 12 pages.

SUMMARY OF THE INVENTION

Technical Problem

However, the first method described above requires that portions other than air pockets provided inside an object have a dense structure and cannot be applied to an object printed with a low filling rate setting in 3D printing.

Further, because the method utilizes a difference in light reflectivity, the method requires that an object is 3D-printed using a translucent material, which transmits light and therefore is only applicable to limited printing materials, like being unable to be applied to an object 3D-printed using an opaque material, which does not transmit light or a metallic material, which reflects light.

The second method described above requires that sound is input through an entrance to an air pocket which is provided in an arbitrary location in an object to be identified and an output of sound that has passed through the air pocket is read at an exit from the air pocket. Accordingly, at least two openings need to be provided in the object and therefore the method can be applied to limited object structures.

The present invention has been made in light of these circumstances and an object of the present invention is to provide an identification device, an identification method, an identification processing program, a generation device, a generation method, and a generation processing program that allow a three-dimensional object to be properly identified.

Means for Solving the Problem

To achieve the object described above, one mode of an identification device according to one embodiment of the present invention includes: a vibration generation unit that generates, by a vibration generator, first vibrations to be provided to a three-dimensional object to be identified having an integrated structure; an acquisition unit that acquires, from a vibration detector, a detection signal corresponding to a second vibration that has propagated inside the three-dimensional object among the first vibrations provided to the three-dimensional object; a feature quantity generation unit that generates a feature quantity indicating a frequency characteristic of the second vibration, based on the acquired detection signal; and an identification unit that identifies the three-dimensional object to be identified, based on a feature quantity stored in a storage device in which the feature quantity indicating a frequency characteristic based on a vibration that has propagated inside a previously identified three-dimensional object is stored and on the feature quantity generated by the feature quantity generation unit.

One mode of an identification method according to one embodiment of the present invention is an identification method performed by an identification device, the identification method includes generating, by a vibration generator, first vibrations to be provided to a three-dimensional object to be identified having an integrated structure; acquiring, from a vibration detector, a detection signal corresponding to a second vibration that has propagated inside the three-dimensional object among the first vibrations provided to the three-dimensional object; generating a feature quantity indicating a frequency characteristic of the second vibration, based on the acquired detection signal; and identifying the three-dimensional object to be identified, based on a feature quantity stored in a storage device in which the feature quantity indicating a frequency characteristic based on a vibration that has propagated inside a previously identified three-dimensional object is stored and on the generated feature quantity.

To achieve the object described above, one mode of a generation device according to one embodiment of the present invention includes a generation unit that, based on a shape of a vibration generator that generates first vibrations to be provided to a three-dimensional object to be identified and a shape of a vibration detector that detects a second vibration that has propagated inside the three-dimensional object among the first vibrations provided to the three-dimensional object, generates a model of a three-dimensional object to be identified, the model having a contact surface adapted for propagating the second vibration.

One mode of a generation method according to one embodiment of the present invention is a generation method performed by a generation device, the generation method including: based on a shape of a vibration generator that generates first vibrations to be provided to a three-dimensional object to be identified and a shape of a vibration detector that detects a second vibration that has propagated inside the three-dimensional object among the first vibrations provided to the three-dimensional object, generating a model of a three-dimensional object to be identified, the model having a contact surface adapted for propagating the second vibration.

Effects of the Invention

According to embodiments of the present invention, a three-dimensional object can be properly identified.

DESCRIPTION OF EMBODIMENTS

One embodiment of the present invention according to the present invention will be described below with reference to drawings.

An identification device according to one embodiment of the present invention analyzes acoustic spectrums that can be obtained by analyzing vibrations propagating inside an object and identifies the object based on a difference between the acoustic spectrums. The identification device analyzes resonance characteristics that vary depending on shape, material, boundary conditions and the like using acoustic spectrums and identifies an object based on a difference between the spectrums.

In one embodiment of the present invention, any medium through which vibrations propagate can be used as an object to be identified regardless of filling rate. Further, in one embodiment of the present invention, any material that has a low sound-wave dumping rate can be used as an object to be identified without the need for providing openings in the object.

Further, in one embodiment of the present invention, object identification models, which are classification models, are generated by using not only data as to whether an object to be identified is one certain subject A or not but also data concerning all objects to be identified which are arbitrarily selectable. Therefore, based on a difference of the object identification models, identification can be made as to what the object to be identified is, for example, a distinction can be made among subject A, subject B, and subject C.

In other words, the identification device is capable of performing not only authentication but also identification of an object at the same time by using the object identification models.

Further, because an acoustic spectrum is associated with an object ID (identification) that is unique to each object, the identification device can identify an object based on the acoustic spectrum.

Further, by providing a plurality of measurement portions or by wisely designing the shapes of measurement portions and the shapes of objects, the accuracy of identification by the identification device can be improved.

Figure 1:
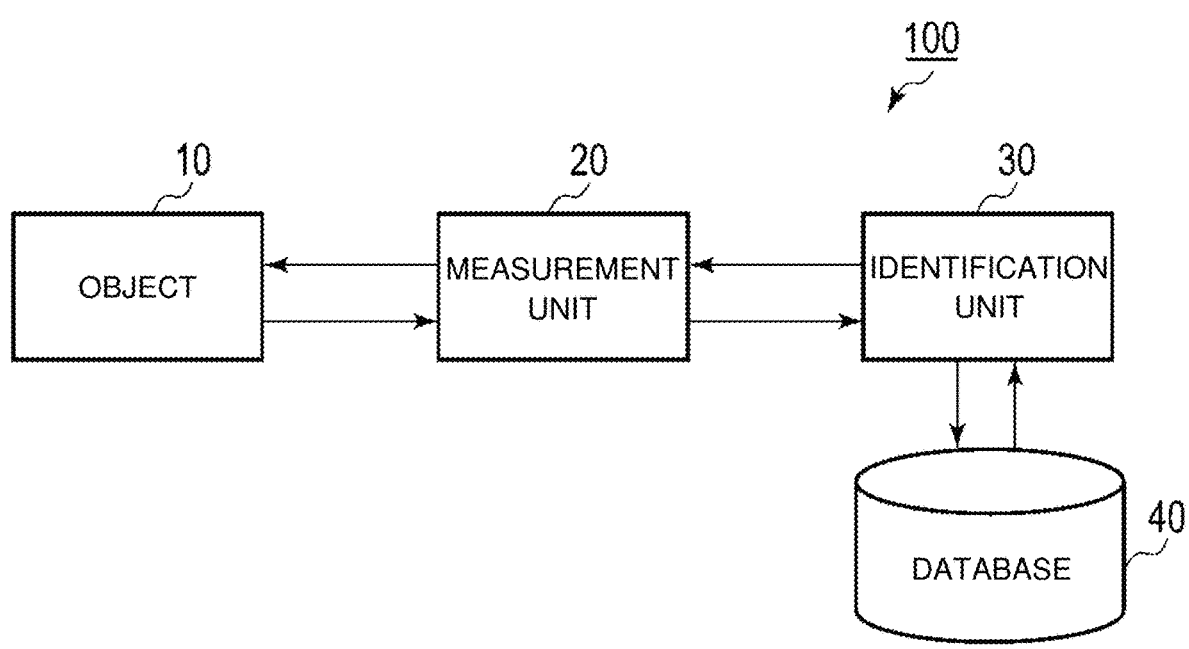
FIG. 1 is a diagram illustrating an exemplary application of an object identification device according to one embodiment of the present invention.

FIG. 1 is a diagram illustrating an exemplary application of an object identification device according to one embodiment of the present invention.

The object identification device 100 according to one embodiment of the present invention may be configured as a computer provided with a central processing unit (CPU), a program memory, an operation memory and the like. The object identification device 100 includes a measurement unit 20, an identification unit 30, and a database 40 as functions required for practicing the embodiment as a configuration for identifying an object 10, as illustrated in FIG. 1. The measurement unit 20 is a resonance characteristic acquisition unit.

Figure 2:
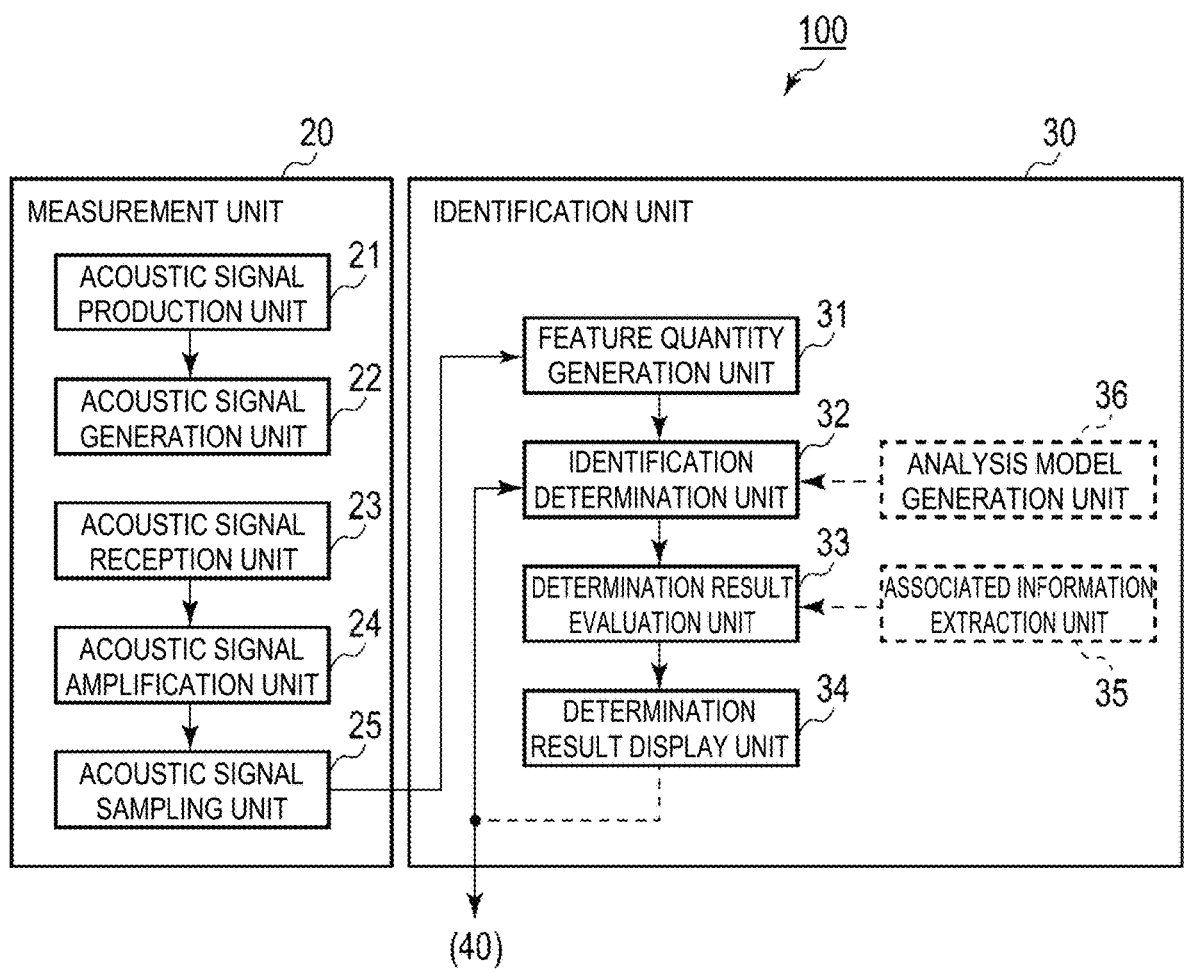
FIG. 2 is a block diagram illustrating exemplary functional configurations of a measurement unit and an identification unit of an object identification device according to one embodiment of the present invention.

FIG. 2 is a block diagram illustrating exemplary functional configurations of a measurement unit and an identification unit of an object identification device according to one embodiment of the present invention.

As illustrated in FIG. 2, the measurement unit 20 includes an acoustic signal production unit 21, an acoustic signal generation unit 22, an acoustic signal reception unit 23, an acoustic signal amplification unit 24, and an acoustic signal sampling unit 25.

As also illustrated in FIG. 2, the identification unit 30 includes a feature quantity generation unit 31, an identification determination unit 32, a determination result evaluation unit 33, and a determination result display unit 34. Further, the identification unit 30 may include an associated information extraction unit 35 and an analysis model generation unit 36. Functions of the associated information extraction unit 35 and the analysis model generation unit 36 will be described later.

Each unit in the object identification device 100 can be implemented by causing a CPU to execute a program stored in a program memory. It should be noted that while the object identification device 100 can be implemented by hardware, the object identification device 100 can also be embodied by a combination of a known computer in which a program including a procedure illustrated in a flowchart, which will be described later, is installed through a medium or a communication line and a database 40, or such a computer that includes a database 40, or the like.

Figure 3:
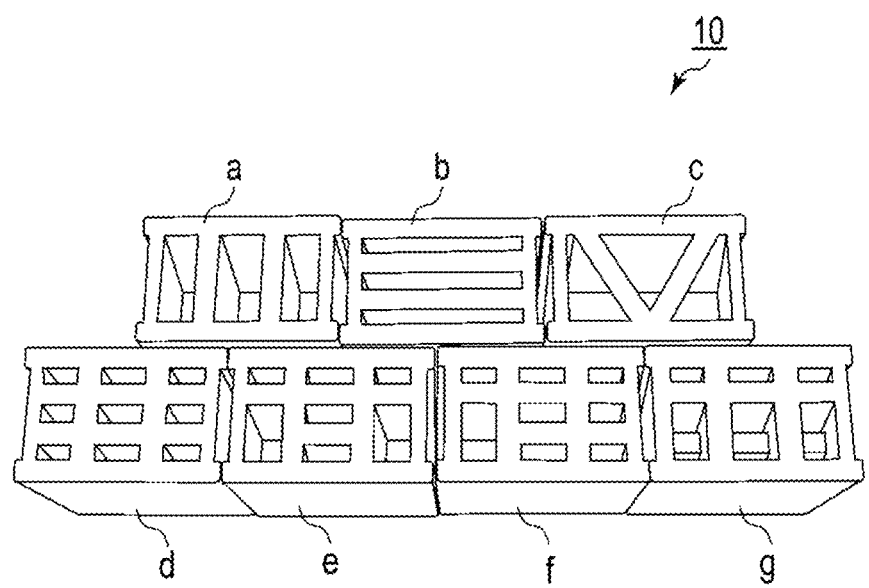
FIG. 3 is a diagram illustrating an example of an object to be identified.
Figure 4:
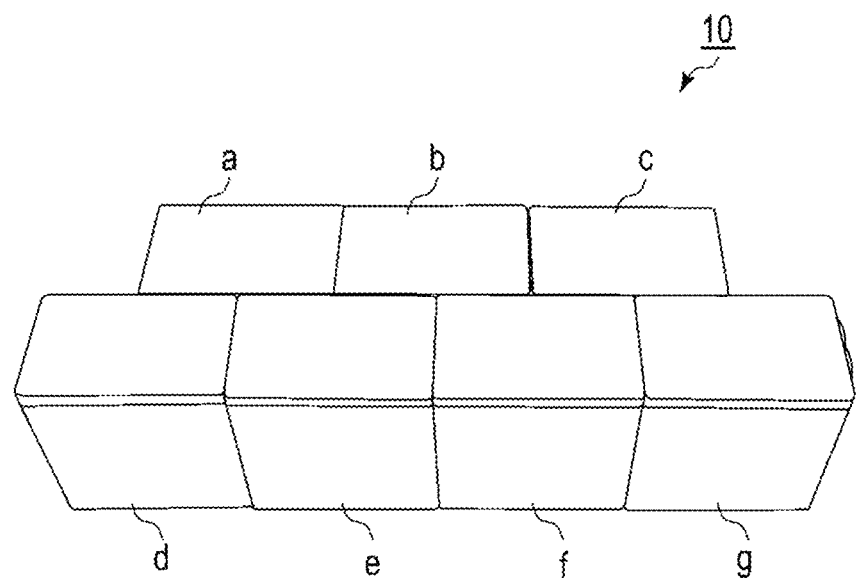
FIG. 4 is a diagram illustrating an example of an object to be identified.

FIGS. 3 and 4 are diagrams illustrating examples of objects to be identified.

In the example illustrated in FIG. 3, seven objects (a, b, c, d, e, f and g in FIG. 3) are illustrated, which collectively have an integrated structure inside the objects.

In one embodiment of the present invention, unlike the prior art, any object to be identified that has an integrated structure inside the object between two points in the object at which a vibration generator connected to the acoustic signal generation unit 22 and a vibration detector connected to the acoustic signal reception unit 23 are respectively brought into contact with the object can be used as an object to be identified, regardless of the filling rate of the internal structure of the object. Further, in one embodiment of the present invention, a translucent material and a metallic material can also be used as an object to be identified.

The vibration generator and the vibration detector described above can be implemented by piezo elements that are not in contact with each other, for example piezoelectric elements. Further, the piezo element can be used as an element for the vibration generator and an element for the vibration detector.

The measurement unit 20 generates an acoustic signal having any frequency characteristic in an ultrasonic band, provides vibrations in the ultrasonic band from the piezo element to an object to be identified, then acquires a vibration that has passed through the object.

The identification unit 30 identifies an object to be identified, based on data on a vibration signal acquired at the measurement unit 20 and presents a result of the identification.

Each of the units of the measurement unit 20 will be described next.

The acoustic signal production unit 21 produces an acoustic signal from which a vibration is generated in the acoustic signal generation unit 22.

The acoustic signal generation unit 22 causes a vibration generator that is in contact with an object to be identified to generate a vibration having the same frequency characteristic as an acoustic signal produced at the acoustic signal production unit 21 and provides the vibration to the object to be identified.

The acoustic signal reception unit 23 causes a vibration detector that is in contact with an object to be identified to detect a vibration of the object resulting from provision of a vibration generated by the acoustic signal generation unit 22 to the object to be identified and receives a signal indicated by the vibration. The acoustic signal generation unit 22 and the acoustic signal reception unit 23 can be implemented by audio interfaces.

The acoustic signal amplification unit 24 acquires a signal from a vibration received at the acoustic signal reception unit 23 and amplifies the signal.

The acoustic signal sampling unit 25 samples a signal amplified by the acoustic signal amplification unit 24 at regular intervals on the time axis.

Each of the units of the identification unit 30 will be described next.

The feature quantity generation unit 31 generates a feature quantity for identifying an object to be identified, based on the waveform of a signal sampled by the acoustic signal sampling unit 25 of the measurement unit 20.

The identification determination unit 32 obtains a numeric value for determining an object to be identified, based on a feature quantity generated by the feature quantity generation unit 31.

The determination result evaluation unit 33 identifies the object to be identified, based on a numeric value obtained by the identification determination unit 32.

The determination result display unit 34 displays a result of identification of the object by the determination result evaluation unit 33 on a display device or the like.

First Embodiment

A first embodiment of the present invention will now be described. In the first embodiment, an acoustic signal provided as a vibration from a measurement unit 20 to an object having an integrated structure is acquired (measured) and, based on a feature quantity representing an acoustic frequency characteristic of the acquired vibration, the object to be identified is identified.

Figure 5:
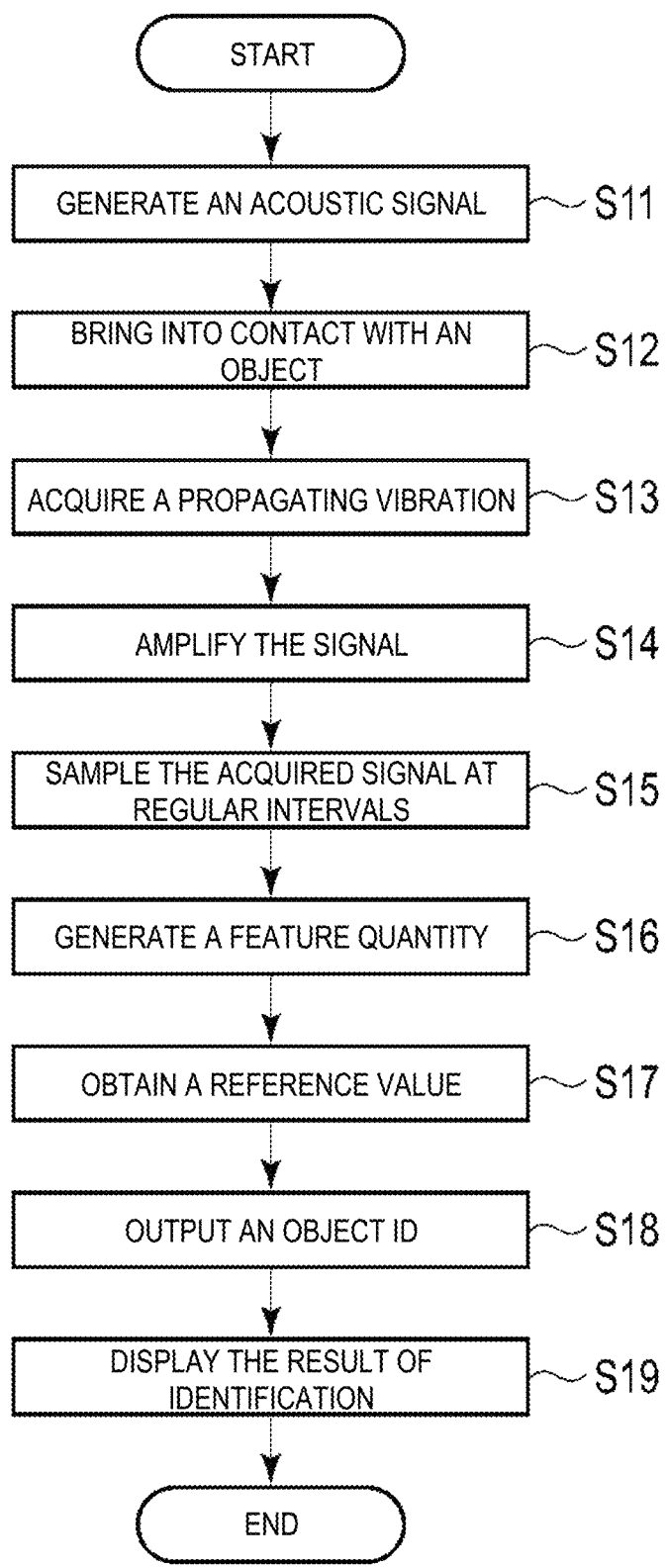
FIG. 5 is a flowchart illustrating an example of a procedure relating to identification by an identification device according to a first embodiment of the present invention.

A specific process performed by the measurement unit 20 and an identification unit 30 will be described below. FIG. 5 is a flowchart illustrating an example of a procedure relating to identification by an identification device according to the first embodiment of the present invention.

(S11) An acoustic signal production unit 21 of the measurement unit 20 produces an acoustic signal based on arbitrarily set parameters.

By way of example, it is assumed that the acoustic signal is an ultrasonic wave that is swept over a frequency band from 20 [kHz] to 40 [kHz]. However, settings for the acoustic signal, such as settings as to whether the signal is swept or not, or whether other frequency bands are used or not, are not particularly limited.

(S12) Then, a vibration generator connected to an acoustic signal generation unit 22 and a vibration detector connected to an acoustic signal reception unit 23 are brought into contact with an object to be identified through a mechanism, for example. For example, the vibration generator and the vibration detector may be attached to an outer edge of the object to be identified by means of double-sided adhesive tape or the like. The vibration generator may be separated from the acoustic signal generation unit 22 of the measurement unit 20 or may be integrated with the acoustic signal generation unit 22. Similarly, the vibration detector may be separated from the acoustic signal reception unit 23 of the measurement unit 20 or may be integrated with the acoustic signal reception unit 23.

The shape and material of the vibration generator and the vibration detector are not particularly limited provided that they can implement a mechanism capable of being in contact with an object to be identified while transmitting vibrations to the object or can implement a method that allows the vibration detector to be in contact with an object to be identified using such mechanism while transmitting vibrations to the object.

The acoustic signal generation unit 22 causes the vibration generator to generate vibrations to be provided to the object to be identified using the acoustic signal produced at the acoustic signal production unit 21 based on the parameters set in advance. As a result, the vibrations are provided to the inside of the object to be identified.

Provided that the vibrations here contain a frequency contained in a vibration that was used when a feature quantity included in registered data concerning a registered object registered in a database 40 was generated by the identification unit 30, the vibrations may also contain other frequencies. In addition, the vibration generator can be formed by piezo elements as described above but may be of any form that can generate vibrations.

(S13) The vibration detector detects a vibration that has been provided to the object to be identified and has propagated inside the object. The acoustic signal reception unit 23 acquires a signal indicated by the detected vibration.

The internal structure of the object to be measured functions as a vibration transmission path when a vibration provided from the vibration generator is transmitted to the vibration detector. Frequency characteristics of the vibrations provided vary from object to object depending on the transmission path.

(S14) An acoustic signal amplification unit 24 converts the vibration acquired by the acoustic signal reception unit 23 to a vibration signal and amplifies the signal.

The processing in S14 is performed because a vibration that has passed through the object to be identified attenuates and therefore the level of the signal needs to be amplified to a level at which the process can be performed.

(S15) A acoustic signal sampling unit 25 acquires the vibration signal amplified by the acoustic signal amplification unit 24 and samples the acquired signal at regular intervals on the time axis.

For example, each time the acoustic signal sampling unit 25 acquires a signal having the number of samples of 8192 ($=2^{13}$), the acoustic signal sampling unit 25 samples the vibration signal. However, the number of samples is not particularly limited.

(S16) A feature quantity generation unit 31 of the identification unit 30 generates a feature quantity that represents an acoustic frequency characteristic or the like by performing Fast Fourier Transform (FFT) on the vibration signal sampled by the acoustic signal sampling unit 25.

(S17) In order to identify the object to be identified, an identification determination unit 32 obtains a reference value which is a difference between a feature quantity indicated by registered data concerning an object identified previously and registered in the database 40 previously and test data which is the feature quantity generated by the feature quantity generation unit 31.

Registered data is data registered in the database 40 in advance, in which a feature quantity measured in advance for a registered object is associated with a unique identifier (hereinafter referred to as an object ID) assigned to the feature quantity.

It is assumed that a reference value is a least square error, a Euclidian distance or the like, for example, and is any indicator such that the greater the degree of similarity of the frequency quantity between test data and a registered data, the smaller the value of the indicator.

(S18) A determination result evaluation unit 33 determines a smallest reference value among reference values obtained by the identification determination unit 32. The determination result evaluation unit 33 outputs, as the result of identification of the object to be identified, a feature quantity in the registered data that is identical to the determined reference value and an object ID of a registered object associated with the feature quantity.

In the first embodiment, the process from S11 through S18 may be repeated multiple times and the determination result evaluation unit 33 may provide an object ID that has been most frequently output as the result of identification of the object to be identified.

In another example of the first embodiment, the process from S11 through S17 may be repeated multiple times and the determination result evaluation unit 33 may determine a smallest reference value among reference values each output in S17 and may output, as the result of identification of the object to be identified, a feature quantity in the registered data that is identical to the determined reference value and an object ID of a registered object associated with the feature quantity.

(S19) A determination result display unit 34 displays the identification result output from the determination result evaluation unit 33.

Second Embodiment

A second embodiment of the present invention will be described next. Descriptions of the second and following embodiments that overlap descriptions of the first embodiment may be omitted. In the second embodiment, additional information, which is information relating to an identification result, is displayed. Examples of the additional information include information concerning a commodity product, such as the name, manufacturer, material, price, time and date of manufacture, and location of manufacture of an object to be identified, information as to how to use the commodity product and the like.

First, the process from S11 through S19 described with respect to the first embodiment is performed.

In the second embodiment, data with which related information concerning an object to be identified is further associated may be registered in a database 40 in advance along with an object ID for the object and a feature quantity representing an acoustic frequency characteristic or the like shown in the above registered data.

Figure 6:
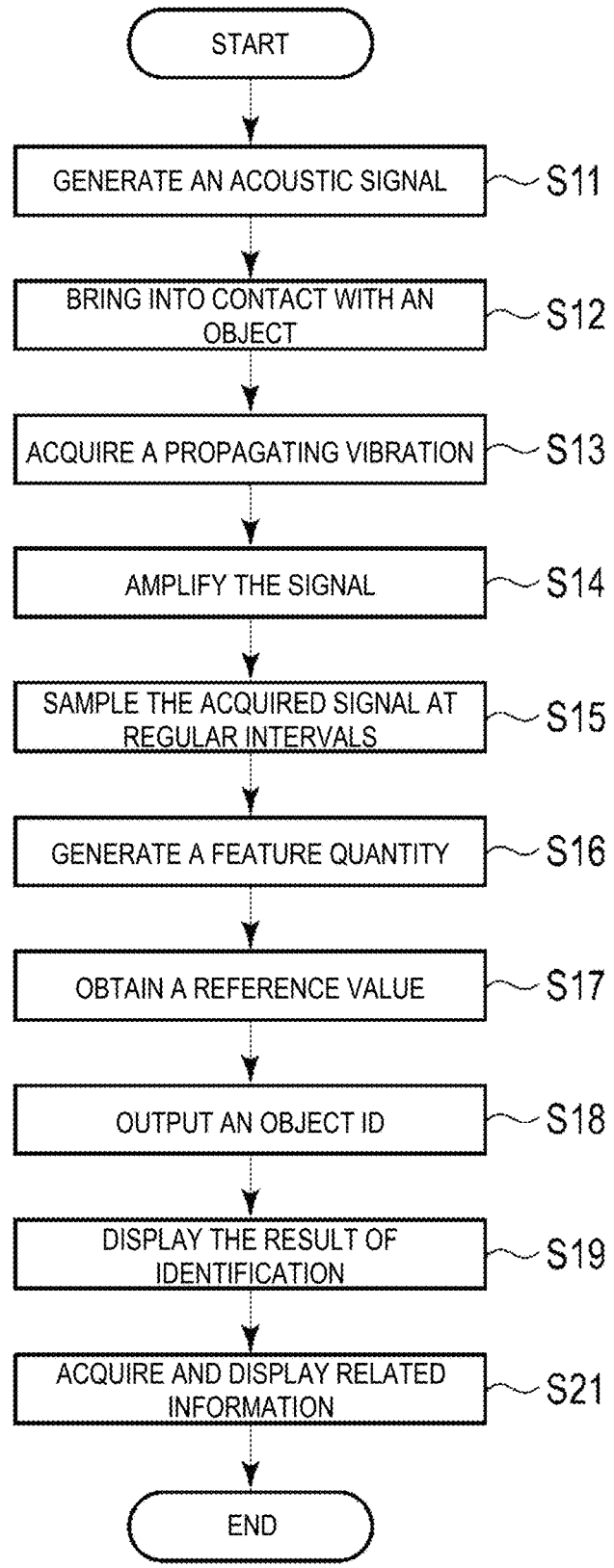
FIG. 6 is a flowchart illustrating an example of a procedure relating to identification by an identification device according to a second embodiment of the present invention.

FIG. 6 is a flowchart illustrating an example of a procedure relating to identification by an identification device according to the second embodiment of the present invention.

(S21) When there is related information relating to a result of identification displayed by a determination result display unit 34, an associated information extraction unit 35 of an identification unit 30 acquires the related information from a database 40 or the like and outputs the related information to a determination result display unit 34. The related information is displayed on the determination result display unit 34 along with the result of identification.

Third Embodiment

A third embodiment of the present invention will be described next.

In the third embodiment, a first example will be described in which machine learning is used in the processing by the identification unit 30 described above with respect to the first embodiment.

Figure 7:
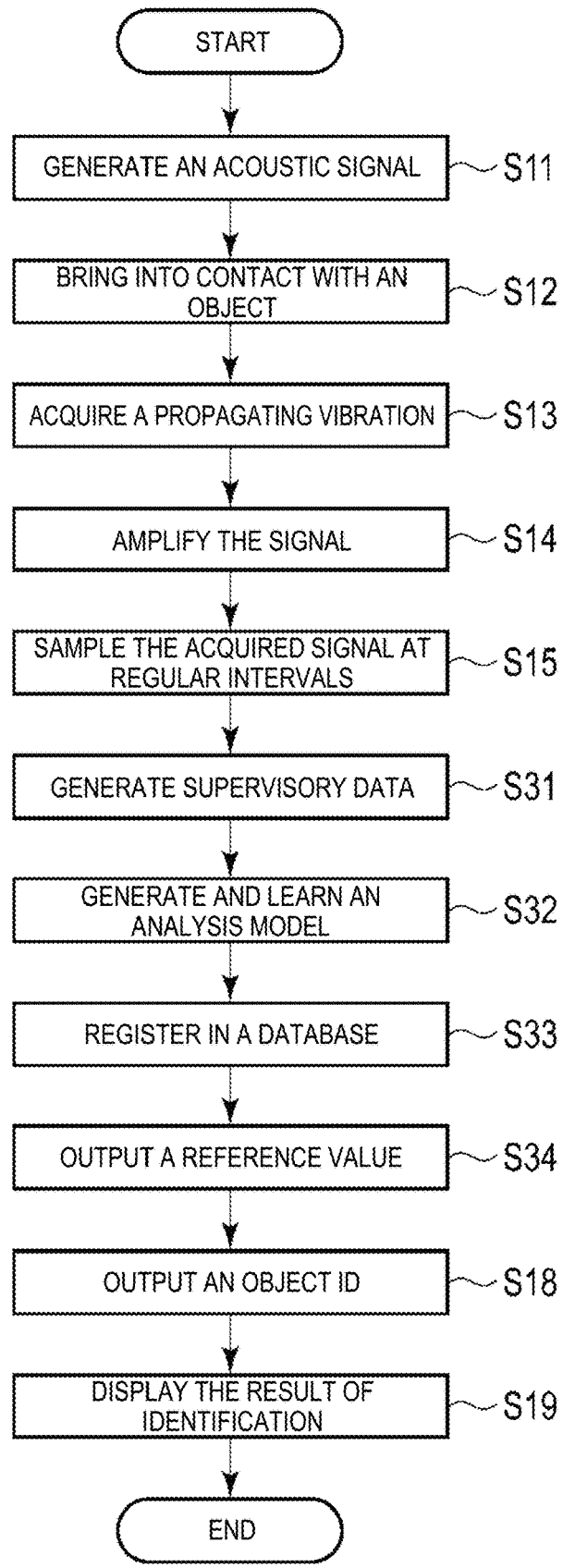
FIG. 7 is a flowchart illustrating an example of a procedure relating to identification by an identification device according to a third embodiment of the present invention.

FIG. 7 is a flowchart illustrating an example of a procedure relating to identification by an identification device according to the third embodiment of the present invention.

First, the process from S11 through S15 described with respect to the first embodiment is performed by a measurement unit 20.

(S31) Then, a feature quantity generation unit 31 of the identification unit 30 generates supervisory data which is a set of a feature quantity representing an acoustic frequency characteristic or the like of an object to be identified and an object ID assigned to the feature quantity.

The supervisory data may be generated based on registered data created in advance as described above and extracted from a database 40. Further, measured data provided from an external source may be employed as supervisory data, instead of generating supervisory data. In other words, generation of supervisory data by the feature quantity generation unit 31 is not essential.

(S32) An analysis model generation unit 36 of the identification unit 30 takes input of the generated feature quantity described above. In response to the input, the analysis model generation unit 36 generates and learns an analysis model that outputs an object ID as a label and a reference value that is a difference from the input.

A generally known machine learning method (library) is used for the analysis model and learning of the analysis model. The analysis model generation unit 36 learns the analysis model so that an algorithm for generating a model, for example Support Vector Machine (SVM), a neural network or the like can obtain an optimum output through parameter tuning or the like on supervisory data.

(S33) The analysis model obtained in this way is registered in a database for models by an identification determination unit 32 as the analysis model itself or as parameters of the analysis model.

(S34) The identification determination unit 32 outputs a reference value based on the feature quantity generated by the feature quantity generation unit 31 and the analysis model.

In a first example of S34 where for example SVM is an algorithm for generating an analysis model in the analysis model generation unit 36, the identification determination unit 32 obtains a score indicating the degree of similarity or the like to each label that the analysis model has for input of a feature quantity.

The identification determination unit 32 converts the obtained score to a reference value and outputs the reference value. Further, if the degree of similarity is normalized and expressed between 0 and 1, for example, the identification determination unit 32 can output the reference value as "1−(degree of similarity)".

In a second example of S34 where for example Random Forest is an algorithm for generating an analysis model in the analysis model generation unit 36, the identification determination unit 32 randomly extracts data from the supervisory data generated in S31 and generates a plurality of decision trees based on the data.

The identification determination unit 32 outputs the number of determination results for each label relating to each of the generated decision trees. The identification determination unit 32 outputs "(number of determination times)− (number of determination results)" as the reference value because a greater number of determination results is a more desirable number.

Further, other algorithms such as a deep neural network may be used as the algorithm for generating a model. In such a case, the reference value may be "1−normalized degree of similarity" or may be a value obtained by converting an original degree of similarity using the reciprocal of the degree of similarity, for example.

In other words, in the third embodiment, a database 40 stores a model into which a feature quantity newly generated for a new object to be identified is input and from which a value based on a difference between a feature quantity of at least one object previously identified and the feature quantity of the new object to be identified is output in association with an object ID uniquely assigned to the object.

Further, in the third embodiment, the identification determination unit 32 inputs a feature quantity newly generated for a new object to be identified into a model and determines that an object ID that is output in association with a value indicating the highest degree of relation to the feature quantity of the new object to be identified (based on the degree of similarity or the reference value) among values output from the model is an object ID of the new object to be identified. By the determination, the identification determination unit 32 identifies the new object to be identified.

Fourth Embodiment

A fourth embodiment of the present invention will be described next.

In the fourth embodiment, a second example will be described in which machine learning is used in the processing by the identification unit 30 described with respect to the first embodiment.

Figure 8:
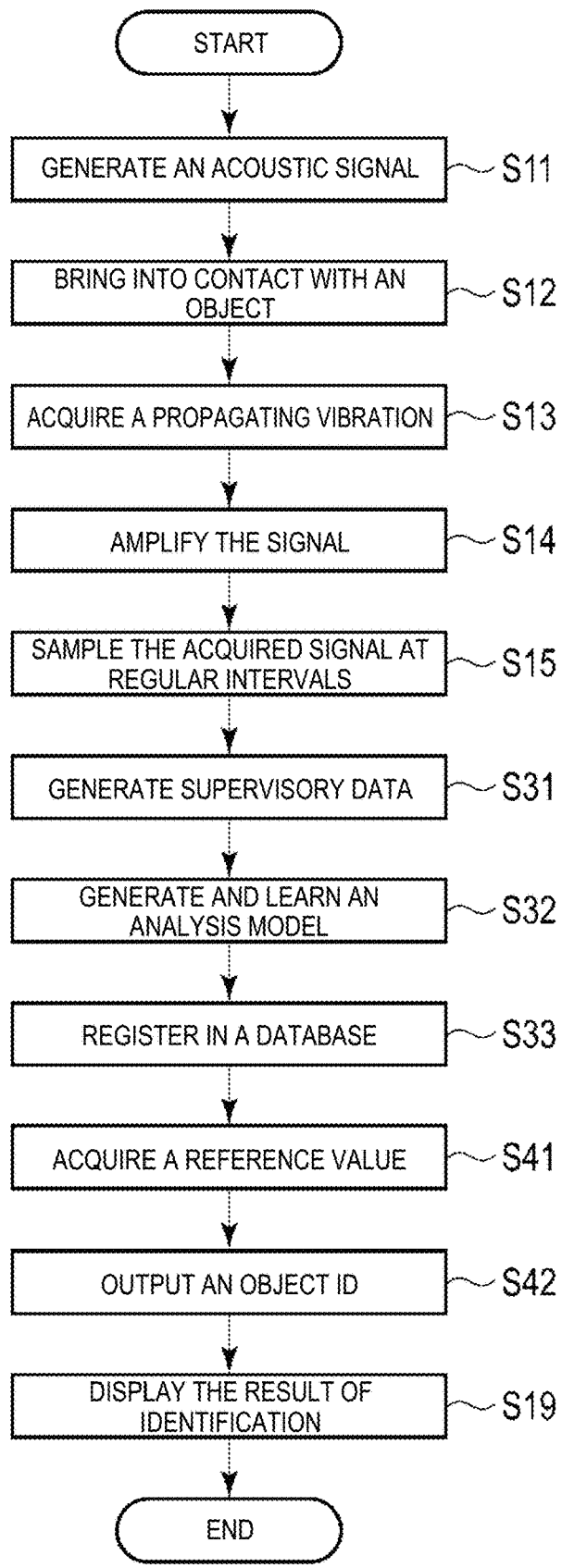
FIG. 8 is a flowchart illustrating an example of a procedure relating to identification by an identification device according to a fourth embodiment of the present invention.

FIG. 8 is a flowchart illustrating an example of a procedure relating to identification by an identification device according to the fourth embodiment of the present invention.

First, the process from S11 through S15 described with respect to the first embodiment is performed by a measurement unit 20.

Then, the process from S31 through S33 described with respect to the third embodiment is performed by an identification unit 30.

(S41) An identification determination unit 32 of the identification unit 30 acquires a list of reference values by using an analysis model obtained through learning and inputting test data into the analysis model.

(S42) A determination result evaluation unit 33 uses the list of reference values acquired in S41 to find a smallest reference value in the list of reference values. The determination result evaluation unit 33 outputs a feature quantity identical to the found reference value in registered data and an object ID associated with the feature quantity as a result of identification of an object to be identified.

After the output, a determination result display unit 34 displays the result of identification output by the determination result evaluation unit 33 in S19 described with respect to the first embodiment.

In the fourth embodiment, the determination result evaluation unit 33 may set a threshold value for reference values that relates to determination relating to the output of an identification result and, only when a reference value is smaller than the threshold value, may determine that a feature quantity identical to the reference value and an object ID associated with the feature quantity are the result of identification of the object to be identified and may output the result.

Fifth Embodiment

A fifth embodiment of the present invention will be described next. In the fifth embodiment, restrictions on the placement of measurement devices (measurement mechanisms) and installation of the measurement devices in a plurality of positions will be described. A measurement device consists of a vibration generator and a vibration detector.

In the first embodiment, a vibration generator and a vibration detector are attached to an arbitrary outer edge of an object to be identified.

In the fifth embodiment, in contrast, a base-type measurement device is provided where a vibration generator and a vibration detector are placed in such a manner that they do not in contact with each other and both of the vibration generator and the vibration detector are fixed so that they contact the bottom surface of an object.

Any form and material may be used for the measurement devices, provided that a mechanism that can be in contact with an object to be identified while transmitting vibrations to the inside of the object can be implemented or a method can be implemented that can use such a mechanism to brought the vibration detector into contact with an object to be identified while transmitting vibrations to the object.

Fixing the measurement device in this way can prevent micro error due to vibrations provided to an object to be identified from varying from measurement to measurement.

Further, a unique identifier may be assigned to each of a plurality of vibration generators and a plurality of vibration detectors, may be registered in a database 40 as additional information of registered data along with the identifiers of a vibration generator and a vibration detector that were used in measurement in addition to a feature quantity representing an acoustic frequency characteristic or the like as described above, and may be used for identifying an object.

For example, feature quantities of objects identified through previous identification processes are stored in a database 40 in association with identifiers uniquely assigned to vibration generators that generated vibrations relating to previous identification and identifiers uniquely assigned to vibration detectors that detected vibrations relating to the previous identification.

A feature quantity generation unit 31 of an identification unit 30 generates a new feature quantity indicating a frequency characteristic, based on a new vibration detected on a new object to be identified.

Then, an identification determination unit 32 of the identification unit 30 extracts, from the database 40, a feature quantity of an object identified previously that is associated with each of an identifier assigned to a vibration generator that has generated a new vibration to be provided to a new object to be identified and an identifier assigned to a vibration detector that has detected a new vibration that has been provided to the new object to be identified by the vibration generator and has propagated inside the object.

The identification determination unit 32 then identifies the new object to be identified, based on the new feature quantity generated by the feature quantity generation unit 31 and the extracted feature quantity.

If a plurality of sets of vibration generators and a plurality of sets of vibration detectors correspond to a feature quantity of one previously identified object in the database 40, a plurality of sets among the sets or all of the sets may be registered in the database 40.

Further, based on identifiers assigned to sets of vibration generators and vibration detectors and feature quantities generated based on vibrations relating to the vibration generators and vibration detectors that belong to each set, the identification determination unit 32 may calculate a reference value as described above for each of the generated feature quantities and may make determination relating to identification of a new object to be identified using each of the calculated reference values, or may calculate a reference value aggregated by a weighted sum or the like of reference values calculated from the generated feature quantities and may identify a new object to be identified, based on the calculated reference value.

Figure 9:
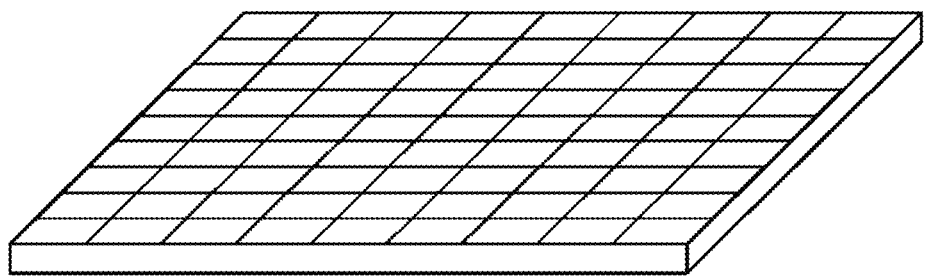
FIG. 9 is a diagram illustrating an example of the external appearance of a measurement device.

FIG. 9 is a diagram illustrating an example of the external appearance of a measurement device.

As an example of form of vibration generators and vibration detectors in this case, a plate is given where piezo elements are arranged in an array as illustrated in FIG. 9. The external appearance of the measurement device may have a shape that is a flat surface as illustrated in FIG. 9 or may have a shape with an uneven surface.

It is assumed that the piezo elements are not in contact with each other in this plate. Here, a vibration generator and a vibration detector can be arbitrarily selected. For example, information indicating a contact surface of a vibration generator that contacts an object, information indicating a contact surface of a vibration detector that contacts an object, and information for determination that indicates a surface of an object to be identified are stored in the database 40 in advance.

Based on the information for determination stored in the database 40, the identification determination unit 32 can select a vibration generator that has an object contact surface adapted to the surface of an object to be identified from among a plurality of vibration generators as a vibration generator to be used for signal generation by the acoustic signal generation unit 22.

Further, Based on the information for determination stored in the database 40, the identification determination unit 32 may select a vibration detector that has an object contact surface adapted to the surface of an object to be identified from among a plurality of vibration detectors as a vibration detector to be used for signal reception by the acoustic signal reception unit 23.

It is assumed that the information for determination used in the selection described above is information including information concerning a vibration generator and a vibration detector that are in a relative positional relationship. After selecting one of a vibration generator and a vibration detector in a relative positional relationship with each other based on the information for determination stored in the database 40 as described above, the identification determination unit 32 may further select the other of the vibration generator and the vibration detector in the relative positional relationship with each other described above.

Further, when there are a plurality of candidate vibration generators that have an object contact surface adapted to the surface of an object to be identified, the identification determination unit 32 may obtain a reference value indicating a difference between the object contact surface of each of the candidate vibration generators and the surface of the object and may select a candidate that relates to a smallest reference value among the obtained reference values, that is, a candidate having the object contact surface that is most similar to the surface of the object to be identified. The same applies to a case where there are a plurality of candidate vibration detectors that have an object contact surface adapted to the surface of an object to be identified.

Further, at least one of the number of vibration generators and the number of vibration detectors may be plural and at least one set of a vibration generator and a vibration detector are placed so that each of the vibration generator and the vibration detector contacts the bottom surface of an object which is indicated by registered data stored in the database 40.

By using any one set among the sets of a vibration generator and a vibration detector in this way, previously identified objects that have a wide variety of bottom shapes indicated by registered data can be accommodated.

Figure 10:
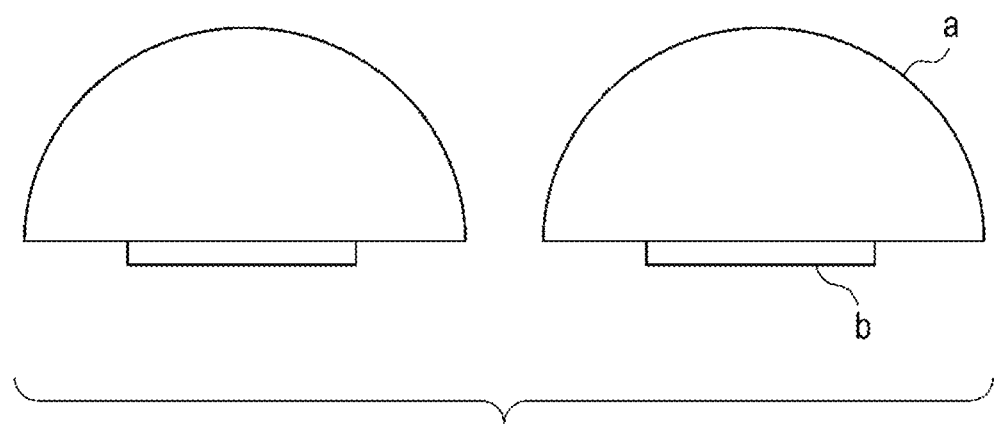
FIG. 10 is a diagram illustrating an example of the external appearance of vibration generators.

FIG. 10 is a diagram illustrating an example of the external appearance of vibration generators.

Further, a form may be used in which a soft material or the like, such as silicon, that can transmit sound is used for a contact surface portion of a vibration generator that contacts an object to be identified, as illustrated in FIG. 10. Such a form allows vibrations to be efficiently transmitted inside an object because the soft material of the vibration generator deforms according to the bottom surface of the object which may have various shapes such as spherical.

Further, in the fifth embodiment, analysis using an analysis model can be applied to the identification unit 30 as described with respect to the third and fourth embodiments, irrespective of shapes of vibration generators and vibration detectors described with respect to the fifth embodiment or the numbers of vibration generators and vibration detectors placed. In other words, the third or fourth embodiment may be combined with the fifth embodiment.

Sixth Embodiment

A sixth embodiment of the present invention will be described next. In the sixth embodiment, generation of a model of an object to be input into a 3D printer will be described.

Here, an example of a process for generating a model to be input into a 3D printer as a model of an object to be identified or a previously identified object in registered data will be described.

Figure 11:
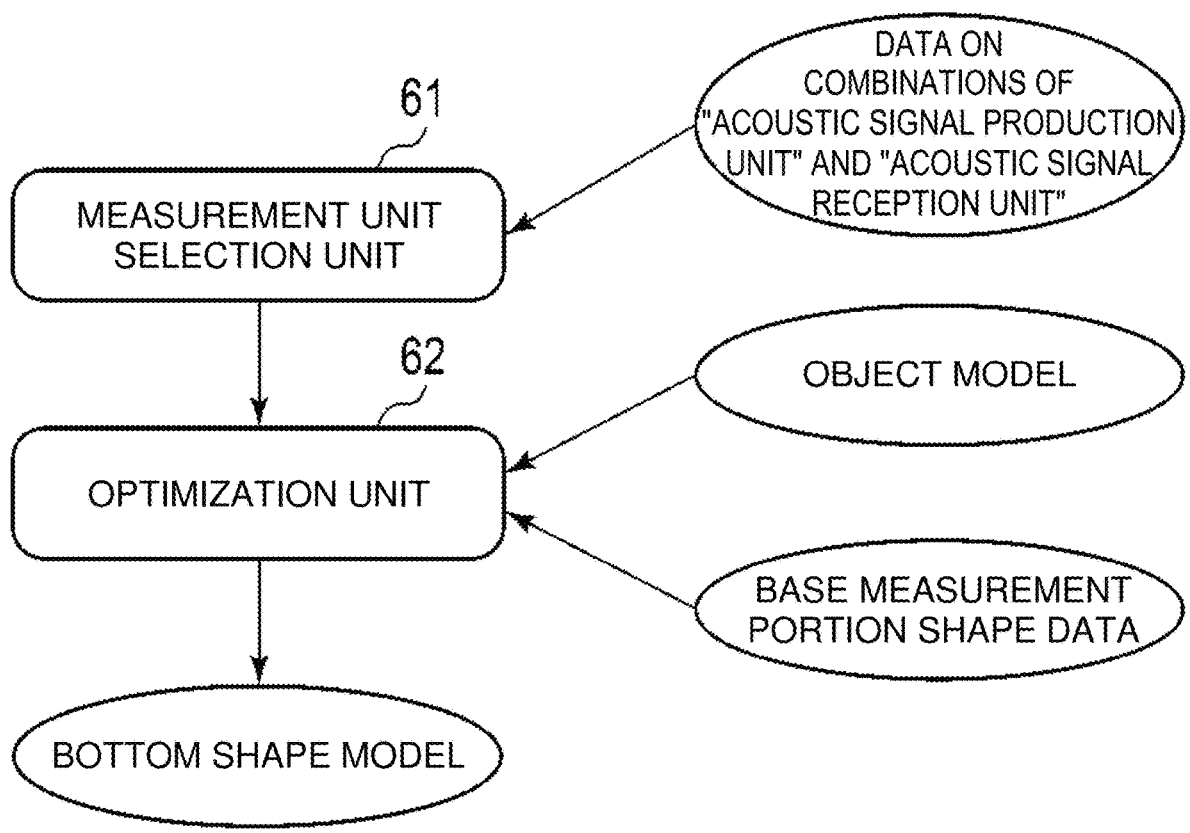
FIG. 11 is a diagram illustrating an example of a functional configuration of an object model generation device according to a sixth embodiment of the present invention.

FIG. 11 is a diagram illustrating an example of a functional configuration of an object model generation device according to the sixth embodiment of the present invention.

As illustrated in FIG. 11, the object model generation device according to the sixth embodiment includes a measurement unit selection unit 61 and an optimization unit 62.

The measurement unit selection unit 61 selects a possible combination of a vibration generator and a vibration detector.

The optimization unit 62 generates a bottom shape model indicating a bottom shape of a model to be input into a 3D printer from data concerning a model of an object and data concerning the shape of a measurement device described with respect to the fifth embodiment. The bottom shape may be any shape whose projections and depressions engage with projections and depressions of a contact surface of a vibration generator or the contact surface of a vibration detector.

In the sixth embodiment, an identifiable bottom surface of an object model to be input into a 3D printer is formed in accordance with the shape of the measurement device described with respect to the fifth embodiment.

Figure 12:
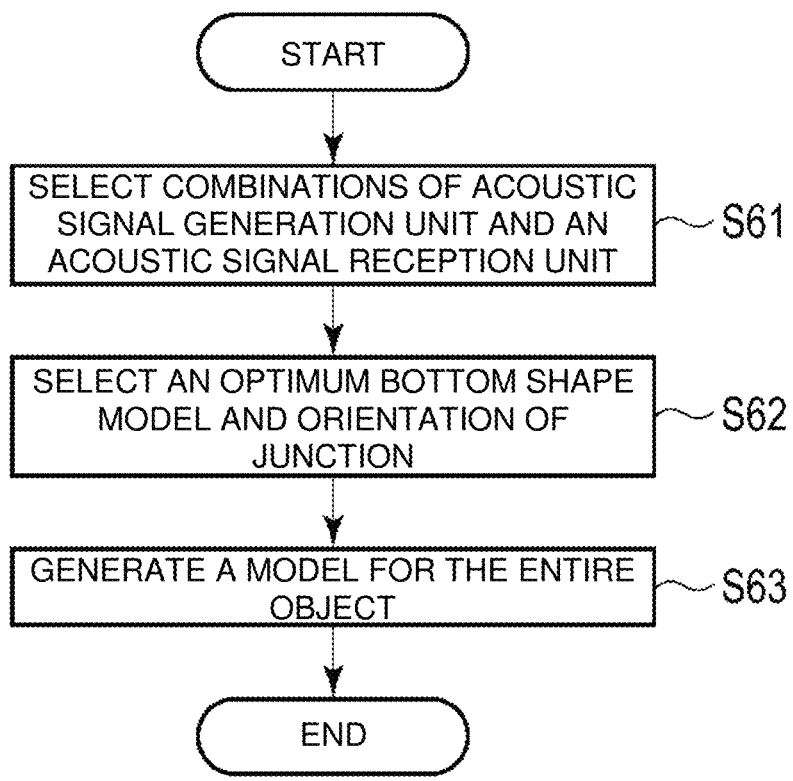
FIG. 12 is a flowchart illustrating an example of a procedure relating to object model generation by the object model generation device according to the sixth embodiment of the present invention.

FIG. 12 is a flowchart illustrating an example of a procedure relating to object model generation using the object model generation device according to the sixth embodiment of the present invention.

(S61) The measurement unit selection unit 61 selects all possible combinations of vibration generators and vibration detectors of the measurement device.

(S62) The optimization unit 62 selects an optimum bottom shape model (base measurement portion shape data) and an orientation of junction between an object and a bottom shape model that satisfy predetermined conditions from among bottom shape models and orientations of junctions registered in a database 40 in advance so that the junction between the object indicated by a model to be input into a 3D printer and an object bottom shape model will be smooth, that is, continuously change, and outputs the result of the selection.

The predetermined conditions are any one or more of, for example, the amount of a material injected during object injection by a 3D printer, the price of the material, injection time, the strength of the object and the like.

It is assumed that the orientation of junction described above is an angle between a reference position of the object and a reference position of a bottom shape model, for example a clockwise angle.

Further, the orientation of junction may be an angle formed by the object and a bottom shape model as appropriate by taking into consideration the center of gravity and the like so that the object can be placed on a location that is not a horizontal plane.

In this way, an identifiable object can be implemented while injection conditions for the object are optimized.

Further, damage or the like to the object during normal use of the object and during measurement by the measurement device can be prevented because the object can be placed stably.

(S63) The object generation device generates a model of the entire object based on the outputs from the optimization unit 62. The model is passed to the 3D printer, whereby a three-dimensional object is injected and formed.

Here, the bottom shape model may be a model that has a recessed shape that accommodates the shape of vibration generators and vibration detectors, for example, illustrated in FIG. 9.

Such a shape facilitates alignment during measurement by the measurement device and, in addition, the object can be placed stably during ordinary use of the object and during measurement of the object by the measurement device.

Advantageous effects of one embodiment of the present invention will be described next.

One embodiment of the present invention is also applicable to an object output by a 3D printer with a low filling rate setting. In other words, the embodiment can be applied independently of the filling rate of an object.

Further, in one embodiment of the present invention, a sound transmission path is inside an object to be identified. Therefore, the embodiment is applicable to an object made of a translucent material, a metallic material or the like that can transmit sound waves, provided that the object has an integrated structure inside the object, thereby eliminating the need for providing openings in the object. Thus, the object can be identified without restrictions on the structure of the object.

Further, by associating an object ID with a feature quantity indicating an acoustic frequency, the object can be identified based on a feature quantity.

Figure 13:
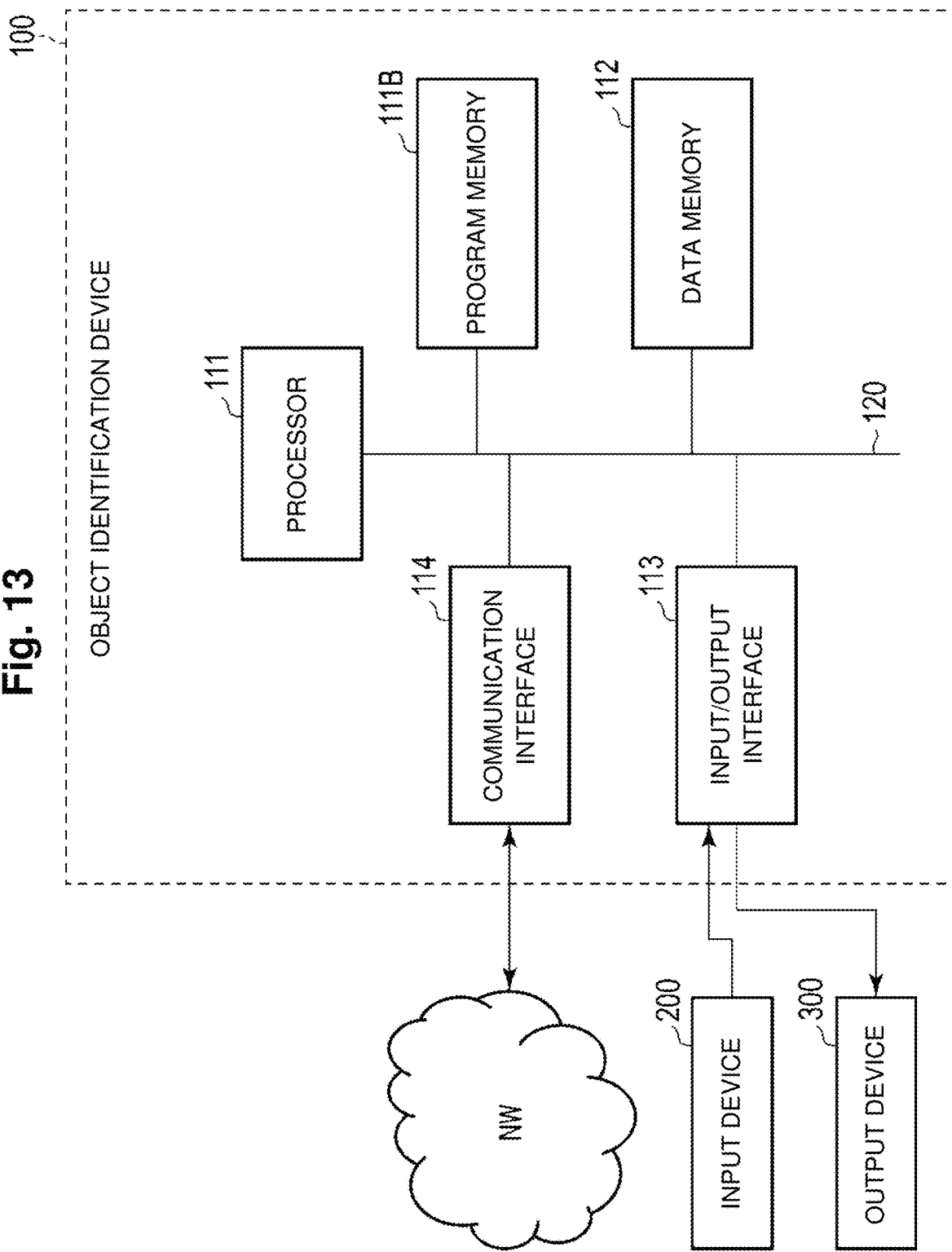
FIG. 13 is a block diagram illustrating an example of a hardware configuration of an object identification device according to one embodiment of the present invention.

FIG. 13 is a block diagram illustrating an example of a hardware configuration of an object identification device according to one embodiment of the present invention.

In the example illustrated in FIG. 22, the object identification device 100 according to the embodiment described above is implemented by a server computer or a personal computer, for example, and includes a hardware processor 111A such as a CPU or the like. A program memory 111B, a data memory 112, an input/output interface 113, and a communication interface 114 are connected to the hardware processor 114A through a bus 120.

The communication interface 114 includes one or more wireless communication interface units, for example, thereby allowing information to be sent and received to and from a communication network NW. An interface for which a low-power wireless data communication standard such as wireless LAN, for example, is employed is used as a wireless interface.

An input device 200 and an output device 300 for an administrator may be connected to the input/output interface 113.

The program memory 111B is a combination of a non-volatile memory, such as an HDD (Hard Disk Drive) or an SSD (Solid State Drive), on which writing and reading can be performed whenever needed, and a non-volatile memory such as a ROM (Read Only Memory) which are used as non-transitory tangible storage media and stores a program required for performing various control processes according to one example embodiment.

The data memory 112 is a combination of a non-volatile memory such as those described above and a volatile memory such as a RAM (Random Access Memory), for example, which is used as a tangle storage medium and is used for storing various kinds of data acquired and generated in the course of various processes performed.

An object identification device 100 according to one embodiment of the present invention can be configured as a data processing device including the units in the measurement unit 20 and the units in the identification unit 30 illustrated in FIG. 2 as processing functional units implemented by software.

A database 40 can be configured by using the data memory 112 illustrated in FIG. 13. However, a storage area in the data memory 112 is not an essential component of the object identification device 100 and may be an area provided in an external storage medium such as a USB (Universal Serial Bus) memory or a storage device such as a database server located in a cloud.

Any of the processing functional units in the units of the object identification device 100 described above can be implemented by causing the hardware processor 111A to read out and execute a program stored in the program memory 111B. It should be noted that some or all of the processing functional units may be implemented in any of various other forms, including an integrated circuit such as an ASIC (Application Specific Integrated Circuit) or an FPGA (Field-Programmable Gate Array).

One mode of an identification device according to one embodiment of the present invention includes a vibration generation unit, an acquisition unit, a feature quantity generation unit and an identification unit. The vibration generation unit generates, by a vibration generator, first vibrations to be provided to a three-dimensional object to be identified having an integrated structure. The acquisition unit acquires, from a generation detector, a detection signal corresponding to a second vibration that has propagated inside the three-dimensional object among the first vibrations provided to the three-dimensional object. The feature quantity generation unit generates a feature quantity indicating a frequency characteristic of the second vibration, based on the acquired detection signal. The identification unit identifies the three-dimensional object to be identified, based on the feature quantity stored in a storage device in which feature quantities indicating frequency characteristics based on vibrations that has propagated inside a previously identified three-dimensional object are stored and on the feature quantity generated by the feature quantity generation unit.

According to a second mode of an identification device of the present invention, in the first mode an identifier uniquely assigned to the vibration generator that has generated the first vibrations relating to identification and an identifier uniquely assigned to the vibration detector that has detected the second vibration relating to identification are stored in the storage device in association with a feature quantity of a three-dimensional object previously identified by the identification unit. Then, the feature quantity generation unit in the second mode generates a feature quantity indicating a frequency characteristic, based on a detection signal acquired by the acquisition unit relating to the three-dimensional object to be identified. Then, the identification unit in the second embodiment extracts, from feature quantities stored in the storage device, a feature quantity of the previously identified three-dimensional object that is associated with each of an identifier assigned to the vibration generator that has generated the first vibrations to be provided to the three-dimensional object to be identified and an identifier assigned to the vibration detector that has detected the second vibration, and identifies the three-dimensional object to be identified, based on the feature quantity generated by the feature quantity generation unit and the extracted feature quantity.

According to a third mode of an identification device of the present invention, in the first or second mode, information indicating a contact surface of the vibration generator that contacts a three-dimensional object, information indicating a contact surface of the vibration detector that contacts a three-dimensional object, and information indicating a surface of a three-dimensional object to be identified are stored in the storage device. Then, based on information stored in the storage device, the identification unit in the third mode selects, from among a plurality of the vibration generators, the vibration generator that has three-dimensional-object contact surface adapted to a surface of the three-dimensional object to be identified as a vibration generator to be used for generating the vibrations, and based on information stored in the storage device, selects, from among a plurality of the vibration detectors, the vibration detector that has a three-dimensional-object contact surface adapted to a surface of the three-dimensional object to be identified as a vibration detector to be used for the acquisition.

According to a fourth mode of an identification device of the present invention, the three-dimensional object is identified as follows. In the first or second mode, a model into which a feature quantity generated for the three-dimensional object to be identified by the feature quantity generation unit is input and which outputs a value based on a difference between a feature quantity of at least one previously identified three-dimensional object and a feature quantity of the three-dimensional object to be identified in association with an identifier uniquely assigned to the three-dimensional object is stored in the storage device. Then, the model is learned based on feature quantities generated by the feature quantity generation unit. Then, the identification unit inputs a feature quantity generated by the feature quantity generation unit for the three-dimensional object to be identified into the model, and determines that an identifier output in association with a value indicating a highest degree of relation to the feature quantity of the three-dimensional object to be identified among values output from the model is an identifier of the three-dimensional object to be identified.

According to a fifth mode of an identification device of the present invention, in the fourth mode an identifier assigned to a vibration generator that has generated a vibration to be provided to the three-dimensional object to be identified and an identifier assigned to a vibration detector that has detected a vibration that has been provided to the three-dimensional object to be identified by the vibration generator and has propagated inside the three-dimensional object are further input into the model, and a value to which the input identifiers are assigned and which is based on a difference between a feature quantity of at least one previously identified three-dimensional object and a feature quantity of the three-dimensional object to be identified is output from the model in association with the identifiers.

In a sixth mode of an identification device of the present invention, the model in the fourth mode is learned based on supervisory data in which a feature quantity generated for the three-dimensional object to be identified and an identifier uniquely assigned to the three-dimensional object to be identified are associated with each other.

A first mode of an identification method according to one embodiment of the present invention is an identification method performed by an identification device and includes generating, by a vibration generator, first vibrations to be provided to a three-dimensional object to be identified that has an integrated structure. The first mode of the identification method includes acquiring, from a vibration detector, a detection signal corresponding to a second vibration that has propagated inside the three-dimensional object among the first vibrations provided to the three-dimensional object. The first mode of the identification method further includes generating a feature quantity indicating a frequency characteristic of the second vibration, based on the acquired detection signal. In addition, the first mode of the identification method includes identifying the three-dimensional object to be identified, based on the feature quantity stored in a storage device in which a feature quantity indicating a frequency characteristic based on a vibration that has propagated inside a previously identified three-dimensional object is stored and on the generated feature quantity.

A second mode of an identification method according to one embodiment of the present invention includes, in the first mode, storing in the storage device, a model into which a feature quantity generated for the three-dimensional object to be identified is input and which outputs a value based on a difference between a feature quantity of at least one previously identified three-dimensional object and the feature quantity of the three-dimensional object to be identified in association with an identifier uniquely assigned to the three-dimensional object. Then, the model is learned based on the feature quantities generated, and the identifying includes inputting a feature quantity generated for the three-dimensional object to be identified into the model, and identifying the three-dimensional object to be identified by determining that an identifier output in association with a value indicating a highest degree of similarity to the feature quantity of the three-dimensional object to be identified among values output from the model is an identifier of the three-dimensional object to be identified.

According to a third mode of an identification method according to one embodiment of the present invention, the generating the feature quantity in the second mode includes generating supervisory data in which a feature quantity generated for the three-dimensional object to be identified and an identifier uniquely assigned to the three-dimensional object to be identified are associated with each other, wherein the model is learned based on the generated supervisory data.

One mode of an identification processing program according to one embodiment of the present invention causes a processor to function as the units of the identification device in any one of the first to sixth modes.

One mode of a generation device according to one embodiment of the present invention includes a generation unit that, based on a shape of a vibration generator that generates first vibrations to be provided to a three-dimensional object to be identified and a shape of a vibration detector that detects a second vibration that has propagated inside the three-dimensional object among the first vibrations provided to the three-dimensional object, generates a model of a three-dimensional object to be identified, the model having a contact surface adapted for propagating the second vibration.

One mode of a generation method according to one embodiment of the present invention is a generation method performed by a generation device and including, based on a shape of a vibration generator that generates first vibrations to be provided to a three-dimensional object to be identified and a shape of a vibration detector that detects a second vibration that has propagated inside the three-dimensional object among the first vibrations provided to the three-dimensional object, generating a model of a three-dimensional object to be identified, the model having a contact surface adapted for propagating the second vibration.

One mode of a generation processing program according to one embodiment of the present invention causes a processor to function as the generation unit of the generation device in the mode described above.

According to a first mode of an identification device according to one embodiment of the present invention, first vibrations to be provided to a three-dimensional object to be identified having an integrated structure is generated by a vibration generator, a detection signal corresponding to a second vibration that has propagated inside the three-dimensional object among the first vibrations is acquired from a vibration detector, a feature quantity indicating a frequency characteristic of the second vibration is generated based on the acquired detection signal, and the three-dimensional object to be identified is identified based on the feature quantity indicating the frequency characteristic based on the feature quantity and the vibration that has propagated inside a previously identified three-dimensional object. In this way, any three-dimensional object that transmits vibrations can be applied as a three-dimensional object to be identified.

According to a second mode of an identification device according to one embodiment of the present invention, an identifier of a vibration generator that has generated first vibrations relating to identification and an identifier of a vibration detector that has detected a second vibration relating to identification are stored in a storage device in association with a feature quantity of a three-dimensional object previously identified, a feature quantity indicating a frequency characteristic is generated based on a detection signal acquired for a three-dimensional object to be identified, a feature quantity of the three-dimensional object previously identified that is associated with each of the identifier of the vibration generator that has generated the first vibrations to be provided to the three-dimensional object to be identified and the identifier of the vibration detector that has detected the second vibration is extracted from feature quantities stored in the storage device, and the three-dimensional object to be identified is identified based on the generated feature quantity and the extracted feature quantity. In this way, a three-dimensional object can be accurately identified according to individualities of a vibration generator and a vibration detector.

According to a third mode of an identification device according to one embodiment of the present invention, based on information indicating a contact surface of a vibration generator that contacts a three-dimensional object, information indicating a contact surface of a vibration detector that contacts a three-dimensional object, and information indicating a surface of a three-dimensional object to be identified that are stored in a storage device, a vibration generator that has a three-dimensional-object contact surface adapted to a surface of the three-dimensional object to be identified is selected as a vibration generator to be used for generating a vibration from among a plurality of vibration generators and a vibration detector that has a three-dimensional-object contact surface adapted to the surface of the three-dimensional object to be identified is selected as a vibration detector to be used for acquiring a detection signal from among a plurality of vibration detectors. In this way, a three-dimensional object can be accurately identified using a vibration generator and a vibration detector that are adapted to a surface of the three-dimensional object to be identified.

According to a fourth mode of an identification device according to one embodiment of the present invention, a model into which a feature quantity generated for a three-dimensional object to be identified is input and which outputs a value based on a difference between a feature quantity of at least one previously identified three-dimensional object and a feature quantity of a new three-dimensional object to be identified in association with an identifier is stored in a storage device, the model is learned based on generated feature quantities, a generated feature quantity is input into the model, and the three-dimensional object to be identified is identified based on a value that indicates a highest degree of relation to a feature quantity of the three-dimensional object to be identified among values output from the model. In this way, a three-dimensional object can be properly identified using a previously identified three-dimensional object.

According to a fifth mode of an identification device according to one embodiment of the present invention, an identifier assigned to a vibration generator that has generated vibrations and an identifier assigned to a vibration detector that has detected a second vibration that has propagated inside the three-dimensional object are further input into the model in the fourth mode, a value to which input identifiers are assigned and which is based on a difference between a feature quantity of at least one previously identified three-dimensional object and a feature quantity of the three-dimensional object to be identified is output from the model in association with the identifiers. In this way, a three-dimensional object can be accurately identified in accordance with individualities of a vibration generator and a vibration detector.

According to a sixth mode of an identification device according to one embodiment of the present invention, a model is learned based on supervisory data in which a feature quantity generated for a new three-dimensional object to be identified and an identifier assigned to the three-dimensional object to be identified are associated with each other. In this way, a three-dimensional object can be identified more accurately.

According to a mode of a generation device according to one embodiment of the present invention, based on shapes of a vibration generator and a vibration detector, a model of a three-dimensional object to be identified is generated that has a contact surface adapted for propagating vibrations. In this way, three-dimensional object to be identified can be properly represented and accurate identification can be achieved.

In short, according to the modes of the present invention, a three-dimensional object can be properly identified.

Further, the method described with respect to each of the embodiments can be distributed as a program (software means) that can be executed by a computer, stored on a recording medium such as a magnetic disk (a Floppy (registered trademark) disk, a hard disk, or the like), an optical disc (a CD-ROM, a DVD, an MO, or the like), or a semiconductor memory (a ROM, a RAM, a Flash memory, or the like), or may be distributed by transmitting the program using a communication medium, for example. It should be noted that programs stored on a medium also include a configuration program that causes a software means (including not only an executable program but also tables and data structures) to be executed by a computer to be configured in the computer. A computer that implements the present device reads the programs stored in the recording medium, and in some cases, constructs the software means using the configuration program, and executes the processes described above by operations controlled by the software means. It should be noted that a recording medium as used herein includes not only recording media for distribution but also storage media such as a magnetic disk and a semiconductor memory provided within the computer or provided in an apparatus connected through a network.

It should be noted that the present invention is not limited to the embodiments described above and various variations are possible in the implementation phase without departing from the spirit of the present invention. Further, any of the embodiments may be combined and implemented as appropriate, whereby effects of the combined embodiments can be provided. Moreover, the embodiments described above include various inventions and various inventions can be extracted by combining constituent features selected from a plurality of constituent features disclosed. For example, when several constituent features are omitted from the constituent features presented in an embodiment, the resulting configuration can be extracted as an invention if the technical problem can be solved and advantageous effects can be provided.

REFERENCE SIGNS LIST

10 Object
20 Measurement unit
21 Acoustic signal production unit
22 Acoustic signal generation unit
23 Acoustic signal reception unit
24 Acoustic signal amplification unit
25 Acoustic signal sampling unit
30 Identification unit
31 Feature quantity generation unit
32 Identification determination unit
33 Determination result evaluation unit
34 Determination result display unit
35 Associated information extraction unit
36 Analysis model generation unit
40 Database
61 Measurement unit selection unit
62 Optimization unit
100 Object identification device

The invention claimed is:
1. An identification device comprising:
a memory configured to store a program; and
a processor configured to execute the program so as to:
cause a vibration generator to generate first vibrations to be provided to a three-dimensional object to be identified having an integrated structure;

acquire, from a vibration detector, a detection signal corresponding to a second vibration that has propagated inside the three-dimensional object among the first vibrations provided to the three-dimensional object;

generate a feature quantity indicating a frequency characteristic of the second vibration, based on the acquired detection signal; and identify the three-dimensional object to be identified based on feature quantities stored in the memory and the generated feature quantity, each of the stored feature quantities indicating a frequency characteristic based on a vibration that has propagated inside each of previously identified three-dimensional objects, wherein an identifier uniquely assigned to the vibration generator that has generated the first vibrations relating to identification and an identifier uniquely assigned to the vibration detector that has detected the second vibration relating to identification are stored in the memory in association with the stored feature quantities of the previously identified three-dimensional objects, and the processor is further configured to:
extract corresponding feature quantities from the stored feature quantities that are respectively associated with the identifier assigned to the vibration generator and the identifier assigned to the vibration detector; and identify the three-dimensional object to be identified based on the extracted corresponding feature quantities and the generated feature quantity.

2. The identification device according to claim 1,
wherein the vibration generator is configured with a plurality of vibration generators, and the vibration detector is configured with a plurality of vibration detectors, information indicating a contact surface of each of the plurality of vibration generators that contacts the three-dimensional object to be identified, information indicating a contact surface of each of the plurality of vibration detectors that contacts the three-dimensional object to be identified, and information indicating a surface of the three-dimensional object to be identified are stored in the memory, and the processor is further configured to:
based on the information stored in the memory, select a first vibration generator to be used for generating the first vibrations from the plurality of vibration generators, the first vibration generator having the contact surface adapted to the surface of the three-dimensional object to be identified; and based on the information stored in the memory, select a first vibration detector to be used for acquiring the detection signal from the plurality of vibration detectors, the first vibration detector having the contact surface adapted to the surface of the three-dimensional object to be identified.

3. The identification device according to claim 1,
wherein a model, into which the generated feature quantity for the three-dimensional object to be identified is input and which outputs a value based on a difference between the stored feature quantity of at least one of the previously identified three-dimensional objects and the generated feature quantity of the three-dimensional object to be identified in association with an identifier uniquely assigned to the at least one of the previously identified three-dimensional objects, is stored in the memory, the model is learned based on the generated feature quantity, and wherein the processor is further configured to:
input the generated feature quantity for the three-dimensional object to be identified into the model; and identify the three-dimensional object to be identified by determining that the identifier output in association with a value indicating a highest degree of similarity to the generated feature quantity of the three-dimensional object to be identified among values output from the model is an identifier of the three-dimensional object to be identified.

4. The identification device according to claim 3,
wherein the identifier assigned to the vibration generator and the identifier assigned to the vibration detector are further input into the model, and the value based on the difference between the stored feature quantity of at least one of the previously identified three-dimensional objects and the generated feature quantity of the three-dimensional object to be identified is output from the model in association with the identifiers assigned to the vibration generator and the vibration detector.

5. The identification device according to claim 3,
wherein the model is learned based on supervisory data in which the generated feature quantity for the three-dimensional object to be identified and an identifier uniquely assigned to the three-dimensional object to be identified are associated with each other.

6. An identification method for causing a processor to execute a process, the identification method comprising executing on the processor the steps of:
causing a vibration generator to generate first vibrations to be provided to a three-dimensional object to be identified having an integrated structure;

acquiring, from a vibration detector, a detection signal corresponding to a second vibration that has propagated inside the three-dimensional object among the first vibrations provided to the three-dimensional object;

generating a feature quantity indicating a frequency characteristic of the second vibration, based on the acquired detection signal; and identifying the three-dimensional object to be identified based on feature quantities stored in a memory and the generated feature quantity, each of the stored feature quantities indicating a frequency characteristic based on a vibration that has propagated inside each of previously identified three-dimensional objects, wherein an identifier uniquely assigned to the vibration generator that has generated the first vibrations relating to identification and an identifier uniquely assigned to the vibration detector that has detected the second vibration relating to identification are stored in the memory in association with the stored feature quantities of the previously identified three-dimensional objects, and the processor is further configured to:
extract corresponding feature quantities from the stored feature quantities that are respectively associated with the identifier assigned to the vibration generator and the identifier assigned to the vibration detector; and identify the three-dimensional object to be identified based on the extracted corresponding feature quantities and the generated feature quantity.

7. The identification method according to claim 6, wherein a model, into which the generated feature quantity for the three-dimensional object to be identified is input and which outputs a value based on a difference between the stored feature quantity of at least one of the previously identified three-dimensional objects and the generated feature quantity of the three-dimensional object to be identified in association with an identifier uniquely assigned to the at least one of the previously identified three-dimensional objects, is stored in the memory, the model is learned based on the generated feature quantity, and the processor is further configured:
input the generated feature quantity generated for the three-dimensional object to be identified into the model; and
identify the three-dimensional object to be identified by determining that the identifier output in association with a value indicating a highest degree of similarity to the generated feature quantity of the three-dimensional object to be identified among values output from the model is an identifier of the three-dimensional object to be identified.

8. The identification method according to claim 7, wherein the generating of the feature quantity includes generating supervisory data in which the generated feature quantity for the three-dimensional object to be identified and an identifier uniquely assigned to the three-dimensional object to be identified are associated with each other, and the model is learned based on the generated supervisory data.

9. The identification method according to claim 7, wherein the identifier assigned to the vibration generator and the identifier assigned to the vibration detector are further input into the model, and the value based on the difference between the stored feature quantity of at least one of the previously identified three-dimensional objects and the generated feature quantity of the three-dimensional object to be identified is output from the model in association with the identifiers assigned to the vibration generator and the vibration detector.

10. The identification method according to claim 6, wherein the vibration generator is configured with a plurality of vibration generators, and the vibration detector is configured with a plurality of vibration detectors, information indicating a contact surface of each of the plurality of vibration generators that contacts the three-dimensional object to be identified, information indicating a contact surface of each of the plurality of vibration detectors that contacts the three-dimensional object to be identified, and information indicating a surface of the three-dimensional object to be identified are stored in the memory, and the processor is further configured to:
based on the information stored in the memory, select a first vibration generator to be used for generating the first vibrations from the plurality of vibration generators, the first vibration generator having the contact surface adapted to the surface of the three-dimensional object to be identified; and based on the information stored in the memory, select a first vibration detector to be used for acquiring the detection signal from the plurality of vibration detectors, the first vibration detector having the contact surface adapted to the surface of the three-dimensional object to be identified.

11. A non-transitory computer-readable medium having computer-executable instructions for causing a computer to execute a process by a processor so as to perform the steps of:

causing a vibration generator to generate first vibrations to be provided to a three-dimensional object to be identified having an integrated structure;

acquiring, from a vibration detector, a detection signal corresponding to a second vibration that has propagated inside the three-dimensional object among the first vibrations provided to the three-dimensional object;

generating a feature quantity indicating a frequency characteristic of the second vibration, based on the acquired detection signal; and identifying the three-dimensional object to be identified based on feature quantities stored in a memory and the generated feature quantity, each of the stored feature quantities indicating a frequency characteristic based on a vibration that has propagated inside each of previously identified three-dimensional objects, wherein an identifier uniquely assigned to the vibration generator that has generated the first vibrations relating to identification and an identifier uniquely assigned to the vibration detector that has detected the second vibration relating to identification are stored in the memory in association with the stored feature quantities of the previously identified three-dimensional objects, and the processor is further configured to:
extract corresponding feature quantities from the stored feature quantities that are respectively associated with the identifier assigned to the vibration generator and the identifier assigned to the vibration detector; and
identify the three-dimensional object to be identified based on the extracted corresponding feature quantities and the generated feature quantity.

12. The non-transitory computer-readable medium according to claim 11, wherein the vibration generator is configured with a plurality of vibration generators, and the vibration detector is configured with a plurality of vibration detectors, information indicating a contact surface of each of the plurality of vibration generators that contacts the three-dimensional object to be identified, information indicating a contact surface of each of the plurality of vibration detectors that contacts the three-dimensional object to be identified, and information indicating a surface of the three-dimensional object to be identified are stored in the memory, and the processor is further configured to:
based on the information stored in the memory, select a first vibration generator to be used for generating the first vibrations from the plurality of vibration generators, the first vibration generator having the contact surface adapted to the surface of the three-dimensional object to be identified; and based on the information stored in the memory, select a first vibration detector to be used for acquiring the detection signal from the plurality of vibration detectors, the first vibration detector having the contact surface adapted to the surface of the three-dimensional object to be identified.

13. The non-transitory computer-readable medium according to claim 11,
wherein a model, into which the generated feature quantity for the three-dimensional object to be identified is input and which outputs a value based on a difference between the stored feature quantity of at least one of the previously identified three-dimensional objects and the generated feature quantity of the three-dimensional object to be identified in association with an identifier uniquely assigned to the at least one of the previously identified three-dimensional objects, is stored in the memory,
the model is learned based on the generated feature quantity, and
the processor is further configured:
input the generated feature quantity generated for the three-dimensional object to be identified into the model; and
identify the three-dimensional object to be identified by determining that the identifier output in association with a value indicating a highest degree of similarity to the generated feature quantity of the three-dimensional object to be identified among values output from the model is an identifier of the three-dimensional object to be identified.

14. The non-transitory computer-readable medium according to claim 13,
wherein the generating of the feature quantity includes generating supervisory data in which the generated feature quantity for the three-dimensional object to be identified and an identifier uniquely assigned to the three-dimensional object to be identified are associated with each other, and
the model is learned based on the generated supervisory data.

15. The non-transitory computer-readable medium according to claim 13,
wherein the identifier assigned to the vibration generator and the identifier assigned to the vibration detector are further input into the model, and
the value based on the difference between the stored feature quantity of at least one of the previously identified three-dimensional objects and the generated feature quantity of the three-dimensional object to be identified is output from the model in association with the identifiers assigned to the vibration generator and the vibration detector.

* * * * *